US009553908B2

(12) United States Patent
Chang (10) Patent No.: US 9,553,908 B2
(45) Date of Patent: Jan. 24, 2017

(54) WIRELESS MUSIC PLAYING METHOD, WIRELESS MUSIC PLAYING SYSTEM AND WIRELESS MUSIC PLAYER

(71) Applicants: Inventec Appliances (Pudong) Corporation, Shanghai (CN); Inventec Appliances Corp., New Taipei (TW)

(72) Inventor: Chuan-Yi Chang, New Taipei (TW)

(73) Assignees: Inventec Appliances (Pudong) Corporation, Shanghai (CN); Inventec Appliance Corp., New Taipei (TW)

( * ) Notice: Subject to any disclaimer, the term of this patent is extended or adjusted under 35 U.S.C. 154(b) by 76 days.

(21) Appl. No.: 14/572,744

(22) Filed: Dec. 16, 2014

(65) Prior Publication Data

US 2016/0054975 A1 Feb. 25, 2016

(30) Foreign Application Priority Data

Aug. 20, 2014 (CN) .......................... 2014 1 0411559

(51) Int. Cl.
*G06F 17/00* (2006.01)
*H04L 29/06* (2006.01)
*G06F 17/30* (2006.01)

(52) U.S. Cl.
CPC ......... *H04L 65/60* (2013.01); *G06F 17/30772* (2013.01)

(58) Field of Classification Search
CPC .... G06F 3/165; G06F 17/30772; H04L 65/60; H04W 84/12
USPC ...... 348/14.01–14.16; 370/351–357; 700/94; 709/201–207, 217–248
See application file for complete search history.

(56) References Cited

U.S. PATENT DOCUMENTS

| | | | | |
|---|---|---|---|---|
| 6,816,703 B1* | 11/2004 | Wood | .................... | G06Q 30/02 455/3.04 |
| 7,224,777 B1* | 5/2007 | Tannenbaum | .... | H04M 1/72547 340/309.16 |
| 7,657,223 B2* | 2/2010 | Kauppinen | ............. | H04L 29/06 379/201.01 |
| 7,725,494 B2* | 5/2010 | Rogers | ............. | G06F 17/30766 707/705 |
| 7,777,121 B2* | 8/2010 | Asano | ............... | G06F 17/30029 84/600 |
| 7,985,911 B2* | 7/2011 | Oppenheimer | ... | G06F 17/30743 700/94 |
| 8,224,775 B2* | 7/2012 | Schwartz | .......... | G06F 17/30029 707/610 |
| 8,918,480 B2* | 12/2014 | Qureshey | .......... | G06F 17/30749 379/101.01 |
| 9,092,462 B2* | 7/2015 | Shan | ................. | G06F 17/30286 |

(Continued)

*Primary Examiner* — Hemant Patel
(74) *Attorney, Agent, or Firm* — CKC & Partners Co., Ltd.

(57) ABSTRACT

The invention discloses a wireless music playing method, a wireless music playing system and a wireless music player, wherein the method includes the following steps. A digital media controller edits a play schedule and delivers the play schedule to a wireless music player, and the play schedule includes a playing time and corresponding location information of a music source. The wireless music player links to the corresponding location information of the music source to play music media data according to the playing time and the corresponding location information of the music source in the play schedule. The technical solution of the invention can simplify the operation of music playing and realize the automatically classified playing according to time.

11 Claims, 4 Drawing Sheets

(56) References Cited

U.S. PATENT DOCUMENTS

| | | | |
|---|---|---|---|
| 2007/0168415 A1* | 7/2007 | Matahira | G10H 1/0058 709/203 |
| 2008/0208908 A1* | 8/2008 | Kashyap | H04N 21/43615 |
| 2009/0069915 A1* | 3/2009 | Khedouri | G06F 17/30094 700/94 |
| 2009/0249222 A1* | 10/2009 | Schmidt | H04N 21/2368 715/751 |

* cited by examiner

WIRELESS MUSIC PLAYING METHOD, WIRELESS MUSIC PLAYING SYSTEM AND WIRELESS MUSIC PLAYER

RELATED APPLICATIONS

This application claims priority to Chinese Application Serial Number 201410411559.3, filed Aug. 20, 2014, which is herein incorporated by reference.

BACKGROUND

Field of Invention

The present invention is related to multimedia playing technology, and more particularly, a wireless music playing method, a wireless music playing system, and a wireless music player.

Description of Related Art

The current wireless music playing technology is mostly by means of artificially real-time operation to realize the selection and playing of particular music sources. The specific description is shown below.

Users use a digital media controller (DMC) to browse music information on a music information network, select desired music from the music information network, record music sources, and send the music sources to a wireless music player in turn. After receiving the music sources, the wireless music player obtains music media data in turn and plays the music media data. The music sources can specifically be web addresses that provide corresponding music media data.

In the conventional art of wireless music playing, it takes much people involvement to manually operate a digital media controller after a selection of a music source and send the music source to a wireless music player in turn. The wireless music player plays music media data related to the received music sources in real time. The speed and efficiency decrease because a large number of selected music sources are operated in turn. In conclusion, there are disadvantages of complicated operation and inconvenience in the method of the conventional art.

SUMMARY

The present invention provides a wireless music playing method. The wireless music playing method can simplify the operation of music playing and realize the automatically classified playing according to time.

The present invention provides a wireless music playing system. The wireless music playing system can simplify the operation of music playing and realize the automatically classified playing according to time.

The present invention provides a wireless music player. The wireless music player can simplify the operation of music playing and realize the automatically classified playing according to time.

A wireless music playing method includes steps of editing a play schedule and delivering the play schedule to a wireless music player by a digital media controller, and the play schedule including a playing time and a corresponding location information of a music source; linking to the corresponding location information of the music source to play music media data by the wireless music player according to the playing time and the corresponding location information of the music source in the play schedule.

A wireless music playing system includes a digital media controller, a wireless music player and a digital media server, wherein the digital media controller edits a play schedule and delivers the play schedule to the wireless music player; the play schedule includes a playing time and a corresponding location information of a music source; the wireless music player receives the play schedule from the digital media controller, sends a request to the digital media server according to the playing time and the corresponding location information of the music source, receives and plays the music media data fed back from the digital media server; the digital media server provides the music media data to the wireless music player according to the request.

A wireless music player includes a playing time confirming unit, a data obtaining unit and a playing unit, wherein the playing time confirming unit receives a play schedule from the digital media controller; the play schedule includes a playing time and a corresponding location information of a music source; the playing time confirming unit confirms that the playing time is reached and sends the corresponding location information of the music source to the data obtaining unit; the data obtaining unit receives the corresponding location information of the music source from the playing time confirming unit, requests a music media data corresponding to the corresponding location information of the music source from the digital media server according to an order of the music source in the play schedule, receives the music media data of the digital music server feedback, and sends the music media data to the playing unit; the playing unit receives the music media data from the data obtaining unit and plays the music media data.

From the above-mentioned aspects, in the present invention, a digital media controller edits a play schedule and delivers the play schedule to a wireless music player; the wireless music player links to a corresponding location information of a music source to play music media data according to a playing time and the corresponding location information of the music source in the play schedule. After editing the play schedule and send the play schedule to the wireless music player, the wireless music player can automatically play the music media data according to the playing time and the corresponding location information of the music source in the play schedule. In the way that the present invention simplifies the operation of music playing and realizes the automatically classified playing according to time.

BRIEF DESCRIPTION OF THE DRAWINGS

The invention can be more fully understood by reading the following detailed description of the embodiment, with reference made to the accompanying drawings as follows.

DETAILED DESCRIPTION

In order to clarify the purposes, technical aspects and advantages of the present invention, the following is the further description of the present invention in detail combined with the embodiments and drawings.

In the conventional art of wireless music playing, it takes people involvement to pay attention to a playing time, when the playing time is reached, send music sources to a wireless music player in turn. Then, the wireless music player obtains music media data in real time and plays the music media data. There are problems of complicated operation and inconvenience in the implementing method. For the technical problems, the present invention provides aspects of automatically classified music playing according to time combined with editing a play schedule.

Figure 1:
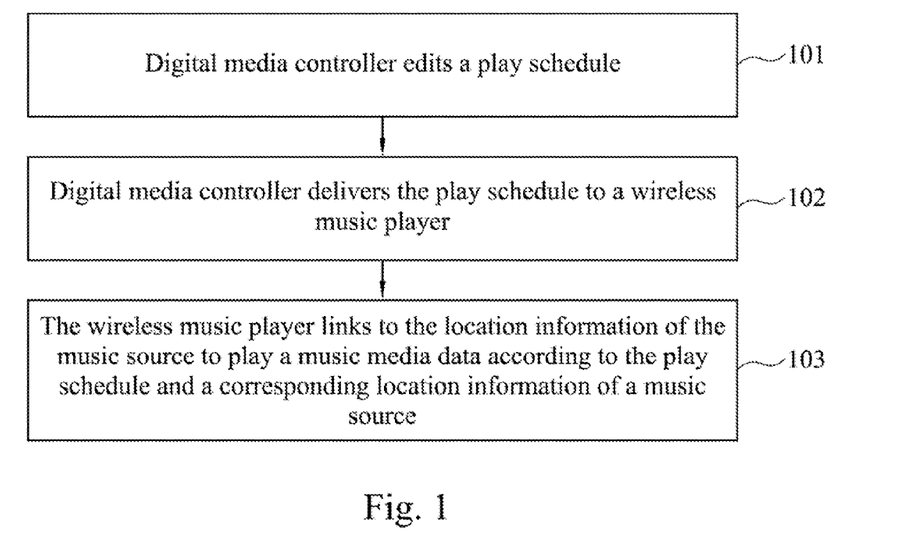
FIG. 1 is a schematic flow chart of a wireless music playing method of the present invention.

FIG. 1 shows a schematic flow chart of a wireless music playing method of the present invention, comprising the steps as follows.

In step 101, a digital media controller edits a play schedule.

The play schedule includes a playing time and a corresponding location information of a music source.

Executing the editing step in advance selects all desired location information of music sources. In practice, it can be accomplished by accessing music information network and obtaining location information of a music source; specifically, for example, the location information of the music source is obtained from Cloud server or Internet. The playing time in the play schedule can be a certain time point or a plurality of time points; if the playing time is a plurality of time points, multiple groups of location information of the music sources corresponding to each time point will also be included.

The contents of the play schedule can be set according to demands and include not only the playing time and all the corresponding location information of the music sources but also a default playing parameter; for example, the default playing parameter can be a sound volume setting, a sound effect setting, and so forth.

In step 102, a digital media controller delivers the play schedule to a wireless music player.

In step 103, the wireless music player links to the corresponding location information of the music source to play music media data according to the playing time and the corresponding location information of the music source in the play schedule.

The wireless music player confirms that the playing time is reached, obtains music media data related to the corresponding location information of the music source in turn from the music information network according to an order of the music source in the play schedule, and plays the obtained music media data.

The wireless music player determines a present time that if the present time reaches the playing time, then the wireless music player obtains and plays the music media data. Specifically, it can be realized with a timer that starts up and is set according to the playing time after the wireless music player receives the play schedule; if a setting time is reached, then the wireless music player obtains and plays the music media data.

The present time is a time provided by a wireless music playing system. Furthermore, the time can be calibrated in advance in order to improve the accuracy of the time in the wireless music player. The steps of time calibrating specifically include accessing the time server so as to obtain the present time from the time server by the wireless music player; using the present time obtained for calibrating a present system time by the wireless music player.

In the above process, if the play schedule further includes a default setting parameter; correspondingly, the steps of playing the music media data by the wireless music player include playing the music media data according to the default playing parameter.

If the default parameter specifically includes the sound volume setting and the sound effect setting; the steps of playing the music media data by the wireless music player include adjusting loudness of sound according to the sound volume setting, setting playing effect of sound according to the sound effect setting, and playing the music media data by the wireless music player.

Furthermore, if the playing time is a periodic setting time, then the wireless music player periodically determines whether the present time meets the periodic setting time, and then confirms that the playing time is reached when the present time meets the periodic setting time.

The periodic time is, for example, a daily setting time in a week, a weekly setting time in a month, or a monthly setting time; another example, for a certain day, the periodic time can be a plurality of different time schedules of the certain day.

The present invention includes editing the play schedule and delivering the play schedule to the wireless music player by the digital media controller; linking to the corresponding location information of the music source to play the music media data by the wireless music player according to the playing time and the corresponding location information of the music source in the play schedule. The present invention includes after editing the play schedule and delivering the play schedule to the wireless music player, automatically playing the music media data by the wireless music player according to the playing time and the corresponding location information of the music source in the play schedule. In the way that the present invention simplifies the operation of music playing and realizes the automatically classified playing according to time.

Figure 2:
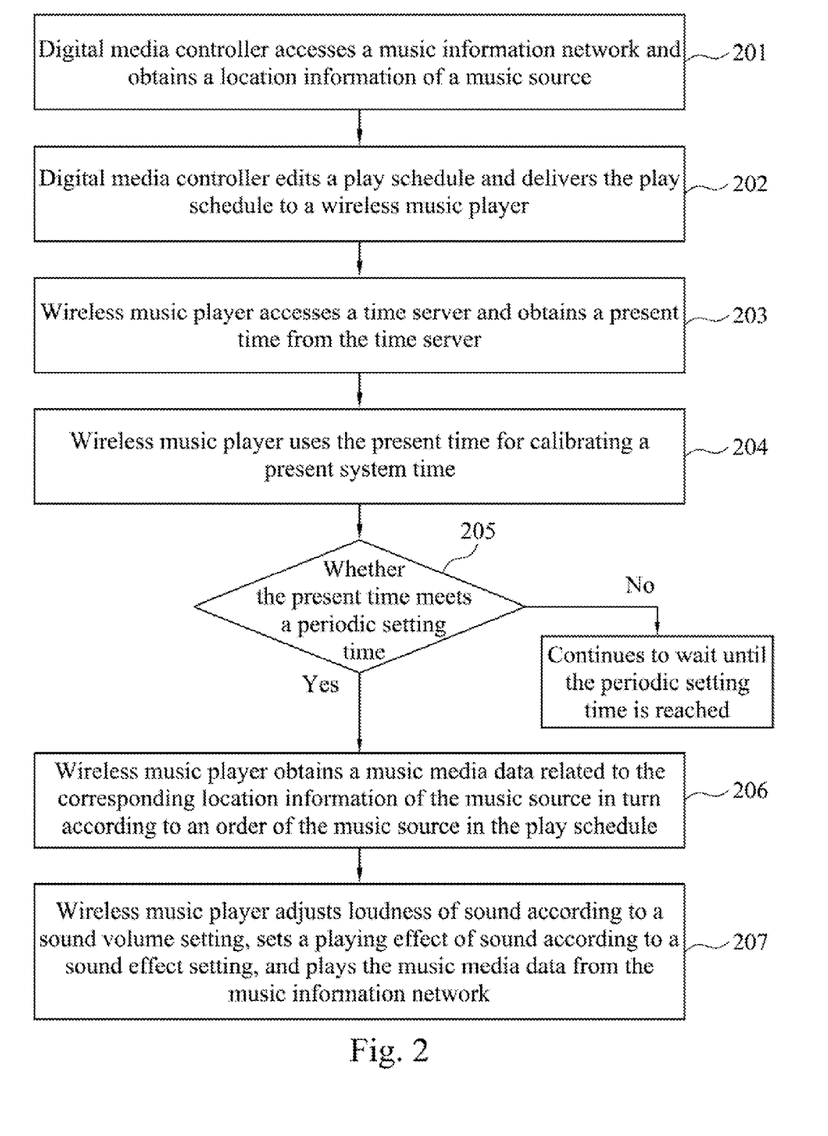
FIG. 2 is a flow chart of a wireless music playing method according to one embodiment of the present invention.

Through the process shown in FIG. 2, the description of an embodiment of the wireless music playing method in the present invention includes the following steps.

In step 201, a wireless music controller accesses a music information network so as to obtain location information of a music source.

The digital media controller can specifically be implemented in a mobile terminal device; when setting of wireless music playing in advance is required, users turn on a wireless music playing client-side in the mobile terminal device; the wireless music playing client-side can assist the users in accessing and selecting music sources and edit a play schedule according to the users' operation.

In step 202, the digital media controller edits the play schedule and delivers the play schedule to a wireless music player.

The playing time in the play schedule can be a certain time point or a plurality of time points; if the playing time is a plurality of time points, multiple groups of location information of the music sources corresponding to each time point will also be included. Furthermore, the playing time can also be set as a periodic setting time, for example, a daily setting time in a week, a weekly setting time in a month, or a monthly setting time; another example, for a certain day, the periodic time can be a plurality of different time schedules of the certain day. In the present embodiment, the playing time is the periodic setting time, specifically, every day at eleven o'clock in the present week, including three corresponding location information in an order of A, B, and C.

According to demands, the play schedule can also include a sound volume setting or a sound effect setting, or both of the sound volume setting and the sound effect setting at the same time, and so forth; in the present embodiment, the play schedule can include the sound volume setting and the sound effect setting at the same time, and specifically the sound effect setting is bass.

The digital controller can deliver the play schedule to the wireless music player through a wired or wireless connection, and so forth; the wireless connection is specifically, for example, WIFI means.

In step 203, the wireless music player accesses a time server so as to obtain a present time from the time server; the time server delivers a standard present time for the wireless music player according to the accessing request.

In step 204, the wireless music player uses the present time for calibrating a present system time.

In step 205, the wireless music player periodically determines whether a present time meets the periodic setting time, and then executes step 206 when the present time meets the periodic setting time; otherwise, the wireless music player continues waiting until the periodic time is reached.

In the present embodiment, the wireless music player turns on a timer every day in the present week, and a setting time of the timer is set as eleven o'clock. If the setting time is reached, step 206 is executed.

In step 206, the wireless music player obtains music media data related to the corresponding location information of the music source in turn from the music information network according to an order of the music source in the play schedule.

In the present embodiment, the wireless music player obtains the corresponding music media data in turn from the music information network according to an order of location information A, B, and C of the music source.

In step 207, the wireless music player adjusts loudness of sound according to the sound volume setting, sets playing effect of sound according to the sound effect setting, and plays the music media data from the music information network.

In the present embodiment, the digital media controller edits the play schedule and sends it to the wireless music player, and then, when a playing time is reached, the wireless music player can automatically play the music media data in turn according to an order that is set in advance. In the way that using a scheduled means can avoid repeated selection and delivery of the location information of the music source by users so that the users can listen to the desired music source at the desired time; therefore, the present invention simplifies the operation of music playing and realizes the automatically classified playing according to time.

Figure 3:
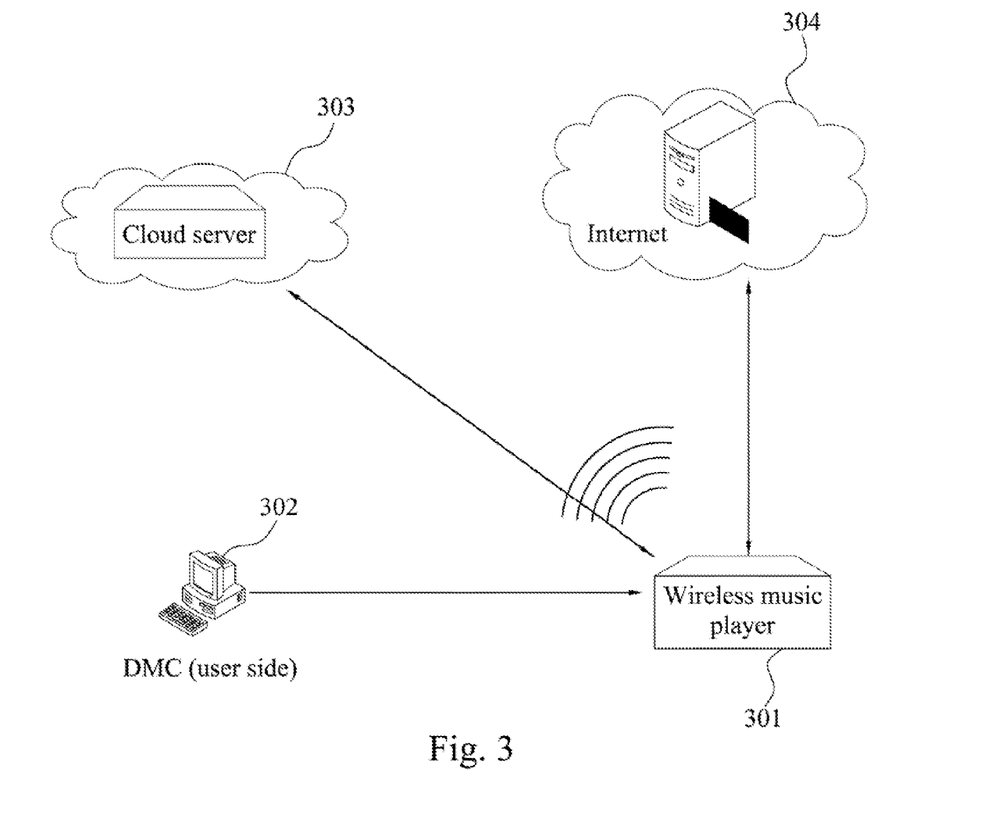
FIG. 3 is a schematic diagram of a network environment of wireless music playing of the present invention.

FIG. 3 shows a schematic diagram of a network environment of wireless music playing of the present invention. On user side, users can edit a play schedule in advance through a digital media controller 302, deliver the edited play schedule to a wireless music player 301; the wireless music player 301 confirms that a playing time comprised in the play schedule is reached, obtains music media data related to a corresponding location information of a music source in turn from Cloud server 303, Internet 304, or other music sources according to an order of the music source in the play schedule, and plays the music media data.

Figure 4:
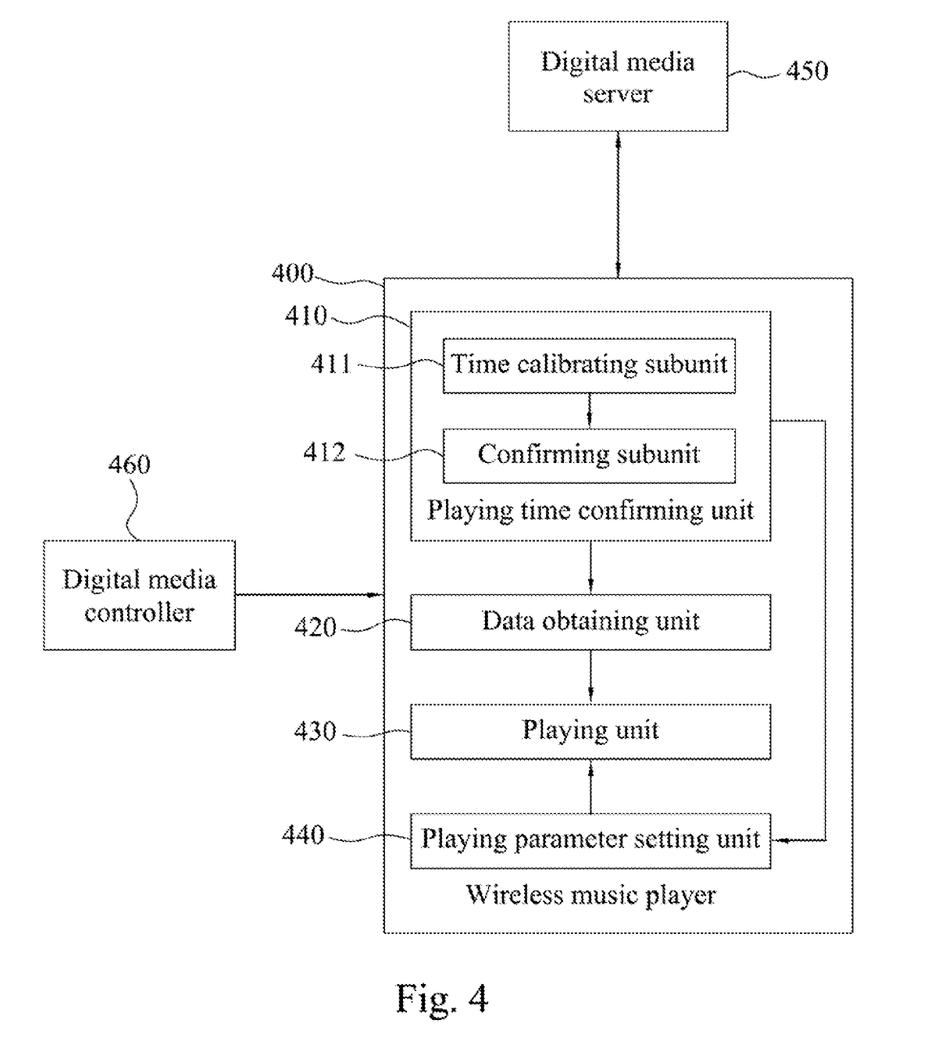
FIG. 4 is a schematic diagram of a wireless music playing system of the present invention.

FIG. 4 shows a schematic diagram of a wireless music playing system of the present invention that the system includes a digital media controller 460, a wireless music player 400 and a digital media server (DMS) 450; the digital media controller 460 edits a play schedule and delivers the play schedule to the wireless music player 400; the play schedule includes a playing time and a corresponding location information of a music source; the wireless music player 400 receives the play schedule from the digital media controller 460, sends a request to the digital media server 450 according to the playing time and the corresponding location information of the music source, receives and plays the music media data fed back from the digital media server 450; the digital media server 450 provides the music media data to the wireless music player 400 according to a request.

The digital media server 450 can be a server specially adapted for multimedia information provision; or a server of Cloud server or Internet combined with music media data provision.

The wireless music player 400 preferably includes a playing time confirming unit 410, a data obtaining unit 420 and a playing unit 430; the playing time confirming unit 410 receives the play schedule from the digital media controller 460, confirms that the playing time is reached, and sends the corresponding location information of the music source to the data obtaining unit 420; the data obtaining unit 420 receives the corresponding location information of the music source from the playing time confirming unit 410, requests music media data related to the corresponding location information of the music source from the digital media server 450 according to an order of the music source in the play schedule, receives the music media data of the digital music server 450 feedback, and sends the music media data to the playing unit 430; the playing unit 430 receives the music media data from the data obtaining unit 420 and plays the music media data.

The play schedule preferably includes a default playing parameter, and the default playing parameter includes a sound volume setting and a sound effect setting.

The wireless music player 400 preferably further includes a playing parameter setting unit 440; the playing time confirming unit 410 sends the default playing parameter in the play schedule to the playing parameter setting unit 440; the playing parameter setting unit 440 receives the default playing parameter from the playing time confirming unit 410 and sets a playing parameter of the playing unit 430 according to the default playing parameter; the playing unit 430 receives the music media data from the data obtaining unit 420 and plays the music media data according to the default playing parameter after setting.

The playing time is preferably a periodic setting time; the playing time confirming unit 410 periodically determines whether a present time meets the periodic setting time, and then confirms that the playing time is reached when the present time meets the periodic setting time.

The playing time confirming unit 410 preferably includes a time calibrating subunit 411 and a confirming subunit 412; the time calibrating subunit 411 receives the play schedule from the digital media controller 460, accesses the time server so as to obtain a present time from the time server, uses the present time obtained for calibrating a present system time, and sends the play schedule to the confirming subunit 412; the confirming subunit 412 receives the play schedule from the time calibrating subunit 411, confirms that the playing time is reached, and sends the corresponding location information of the music source to the data obtaining unit 420.

The above-mentioned contents are merely better embodiments of the present invention and not used to limit the present invention. It is intended that the modifications, equivalent replacements and improvements within the scope or principle of the invention should be covered within the scope claimed by the present invention.

What is claimed is:

1. A wireless music playing method, comprising:
editing a play schedule and delivering the play schedule to a wireless music player by a digital media controller, and the play schedule comprising a playing time, a corresponding location information of music sources, an order of the music sources and a default playing parameter, wherein the default playing parameter comprises a sound volume setting and a sound effect setting; and
linking to the corresponding location information of the music sources at the playing time to play music media data by the wireless music player according to the corresponding location information of the music sources and the order of the music sources in the play schedule.

2. The wireless music playing method of claim 1, wherein the step of playing the music media data by the wireless music player comprises:
playing the music media data according to the default playing parameter.

3. The wireless music playing method of claim 1, wherein the step of playing the music media data by the wireless music player comprises:
adjusting loudness of sound according to the sound volume setting, setting playing effect of sound according to the sound effect setting, and playing the music media data by the wireless music player.

4. The wireless music playing method of claim , wherein the playing time is a periodic setting time;
periodically determining whether a present time meets the periodic setting time, and then confirming that the playing time is reached when the present time meets the periodic setting time by the wireless music player.

5. The wireless music playing method of claim 1, further comprising:
accessing a time server by the wireless music player, so as to obtain a present time from the time server; and
using the present time for calibrating a present system time by the wireless music player.

6. A wireless music playing system, comprising:
a digital media controller, a wireless music player and a digital media server,
wherein the digital media controller edits a play schedule and delivers the play schedule to the wireless music player, wherein the play schedule comprises a playing time, a corresponding location information of music sources, an order of the music sources and a default playing parameter, wherein the default playing parameter comprises a sound volume setting and a sound effect setting;
the wireless music player receives the play schedule from the digital media controller, and sends a request at the playing time to the digital media server according to the corresponding location information of the music sources and the order of the music sources, and receives and plays music media data fed back from the digital media server; and
the digital media server provides the music media data to the wireless music player according to the request.

7. The wireless music playing system of claim 6, wherein the wireless music player comprises a playing time confirming unit, a data obtaining unit and a playing unit,
wherein the playing time confirming unit receives the play schedule from the digital media controller, confirms that the playing time is reached, and sends the corresponding location information of the music sources to the data obtaining unit;
the data obtaining unit receives the corresponding location information of the music sources from the playing time confirming unit, requests music media data related to the corresponding location information of the music sources from the digital media server according to the order of the music sources in the play schedule, receives the music media data of the digital music server feedback, and sends the music media data to the playing unit;
the playing unit receives the music media data from the data obtaining unit and plays the music media data.

8. A wireless music player, comprising:
a playing time confirming unit, a data obtaining unit and a playing unit,
wherein the playing time confirming unit receives a play schedule from a digital media controller; the play schedule comprises a playing time, corresponding location information of music sources, an order of the music sources and a default playing parameter, wherein the default playing parameter comprises a sound volume setting and a sound effect setting;
the playing time confirming unit confirms that the playing time is reached and sends the corresponding location information of the music sources to the data obtaining unit;
the data obtaining unit receives the corresponding location information of the music sources from the playing time confirming unit, requests, at the playing time, a music media data corresponding to the corresponding location information of the music sources from the digital media server according to an order of the music sources in the play schedule, receives the music media data of the digital music server feedback, and sends the music media data to the playing unit; and
the playing unit receives the music media data from the data obtaining unit and plays the music media data.

9. The wireless music player of claim 8, further comprising a playing parameter setting unit,
wherein the playing time confirming unit sends the default playing parameter in the play schedule to the playing parameter setting unit;
the playing parameter setting unit receives the default playing parameter from the playing time confirming unit and sets a playing parameter of the playing unit according to the default playing parameter;
the playing unit receives the music media data from the data obtaining unit and plays the music media data according to the default playing parameter after setting.

10. The wireless music player of claim 8, wherein the playing time is a periodic setting time;
the playing time confirming unit periodically determines whether a present time meets the periodic setting time, and then confirms that the playing time is reached when the present time meets the periodic setting time.

11. The wireless music player of claim 8, wherein the playing time confirming unit comprises a time calibrating subunit and a confirming subunit,
wherein the time calibrating subunit receives the play schedule from the digital media controller, accesses a time server so as to obtain a present time from the time server, uses the present time obtained for calibrating a present system time, and sends the play schedule to the confirming subunit;

the confirming subunit receives the play schedule from the time calibrating subunit, confirms that the playing time is reached, and sends the corresponding location information of the music source to the data obtaining unit.

\* \* \* \* \*